(12) United States Patent
Azzarello et al.

(10) Patent No.: US 11,400,428 B2
(45) Date of Patent: Aug. 2, 2022

(54) FLUIDIZED-BED REACTOR HAVING MULTIPLE RECYCLE GAS INLET NOZZLES

(71) Applicant: BASELL POLYOLEFINE GMBH, Wesseling (DE)

(72) Inventors: Emanuele Azzarello, Ferrara (IT); Gabriele Mei, Channelview, TX (US); Giulia Mei, Ferrara (IT); Giuseppe Penzo, Ferrara (IT); Rosario Pesare, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 266 days.

(21) Appl. No.: 16/613,626

(22) PCT Filed: May 15, 2018

(86) PCT No.: PCT/EP2018/062433
§ 371 (c)(1),
(2) Date: Nov. 14, 2019

(87) PCT Pub. No.: WO2018/210780
PCT Pub. Date: Nov. 22, 2018

(65) Prior Publication Data
US 2020/0222872 A1 Jul. 16, 2020

(30) Foreign Application Priority Data

May 17, 2017 (EP) .................................... 17171511

(51) Int. Cl.
*B01J 8/18* (2006.01)
*B01J 8/44* (2006.01)
*C08F 2/01* (2006.01)

(52) U.S. Cl.
CPC ............ *B01J 8/1827* (2013.01); *B01J 8/1836* (2013.01); *B01J 8/44* (2013.01); *C08F 2/01* (2013.01);
(Continued)

(58) Field of Classification Search
CPC . B01J 8/1827; B01J 8/1836; B01J 8/44; B01J 2208/00168; B01J 2208/00761; B01J 2208/00938; B01J 8/24; C08F 2/01
(Continued)

(56) References Cited

U.S. PATENT DOCUMENTS

| | | |
|---|---|---|
| 2,543,863 A | 3/1951 | Martin et al. |
| 6,117,399 A | 9/2000 | Jorgensen et al. |

(Continued)

FOREIGN PATENT DOCUMENTS

| | | | |
|---|---|---|---|
| CA | 2982471 A1 * | 10/2016 | ......... A61B 17/7098 |
| CN | 104277882 A | 1/2015 | |

(Continued)

OTHER PUBLICATIONS

International Search Report and Written Opinion dated Jun. 22, 2018 (dated Jun. 22, 2018) for Corresponding PCT/EP2018/062433.

*Primary Examiner* — Huy Tram Nguyen

(57) ABSTRACT

Fluidized-bed reactor for the gas-phase polymerization of olefins including a gas distribution grid installed in a lower part of the fluidized-bed reactor and a gas recycle line, which is equipped with a compressor and a heat exchanger and which is connected at the upper end with the top of the fluidized-bed reactor, wherein the gas recycle line splits at the lower end in at least two horizontal branches which are connected tangentially with the fluidized-bed reactor below the gas distribution grid and a process for preparing an olefin polymer carried out in the fluidized-bed reactor.

13 Claims, 2 Drawing Sheets

(52) U.S. Cl.
CPC ............... *B01J 2208/00168* (2013.01); *B01J 2208/00761* (2013.01); *B01J 2208/00938* (2013.01)

(58) Field of Classification Search
USPC ........................................................ 526/348
See application file for complete search history.

(56) References Cited

U.S. PATENT DOCUMENTS

| | | | | |
|---|---|---|---|---|
| 2002/0128407 | A1* | 9/2002 | Hamba | ............... C08F 10/00 526/170 |
| 2014/0309384 | A1* | 10/2014 | Covezzi | ............... C08F 10/00 422/135 |
| 2016/0030906 | A1 | 2/2016 | Crnkovic et al. | |

FOREIGN PATENT DOCUMENTS

| | | | | |
|---|---|---|---|---|
| EP | 0088638 | A2 | 9/1983 | |
| EP | 0600414 | A1 | 6/1994 | |
| EP | 0697421 | A1 | 2/1996 | |
| EP | 2125190 | A1 * | 12/2009 | ............ B01J 8/1818 |
| WO | 9704015 | A1 | 2/1997 | |
| WO | 0002929 | A1 | 1/2000 | |
| WO | 2007071527 | A1 | 6/2007 | |
| WO | 2008074632 | A1 | 6/2008 | |
| WO | 2013083548 | A2 | 6/2013 | |

* cited by examiner

FLUIDIZED-BED REACTOR HAVING MULTIPLE RECYCLE GAS INLET NOZZLES

This application is the U.S. National Phase of PCT International Application PCT/EP2018/062433, filed May 15, 2018, claiming benefit of priority to European Patent Application No. 17171511.3, filed May 17, 2017, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to fluidized-bed reactors for the gas-phase polymerization of olefins and related processes.

BACKGROUND OF THE INVENTION

In some instances, gas-phase polymerization processes are used to prepare polyolefins such as homopolymers of ethylene or propylene or copolymers of ethylene or propylene with other olefins. In some instances, fluidized-bed reactors are used for carrying out such gas-phase polymerization processes and contain a bed of polymer particles which is maintained in a fluidized state by an upward flow of a fluidizing gas. Some reactors include a reactor space in the form of a vertical cylinder provided with conical head. In this calming zone, there is a lower gas velocity as a result of the larger diameter. In addition, these reactors have a recycle gas line in which coolers for removing the heat of polymerization, a recycle gas compressor and, if desired, further elements such as a cyclone for removing fine polymer dust are installed. In some instances, monomers consumed by the polymerization reaction are replaced by adding make-up gas to the recycle gas stream.

To achieve a homogeneous distribution of the fluidizing gas in the bed of growing polymer particles, some reactors are equipped with a gas distribution grid, sometimes also called gas fluidization grid or distribution plate. Such a gas distribution grid is a device provided with apertures which dispense into the bed a gas stream introduced under the grid itself. The grid also acts as support for the bed when the supply of gas is cut off.

In some instances, the gas distribution grid is configured as perforated or porous plate, sometimes in combination with an upstream flow divider. In some instances, roof-shaped deflector plates are arranged above the holes in the distributor plate or to cover the holes with a cap. In some instances, the geometry of the gas distribution grid deviates from a plate, for example, a double cone-body or in the form of an inverted cone. In some instances, the gas distribution grid has integrated a vertically oriented pipe for discharging polymer.

In some instances, the fluidization gas is introduced into the fluidized-bed reactor below the gas distribution grid. Due to the high amount of circulated fluidization gas and the consequently large size of the gas inlet nozzle, a relatively large volume is below the gas distribution grid. It is believed that the volume below the gas distribution grid is lost space that does not contribute to the production of polyolefin, increases the volume of the fluidized-bed reactor, and increases construction costs. Furthermore, polymer particles carried over through the recycle gas line should not be deposited in the volume below the gas distribution grid.

SUMMARY OF THE INVENTION

In a general embodiment, the present disclosure provides a fluidized-bed reactor for the gas-phase polymerization of olefins including a gas distribution grid installed in a lower part of the fluidized-bed reactor and a gas recycle line, which is equipped with a compressor and a heat exchanger and which is connected at the upper end with the top of the fluidized-bed reactor, wherein the gas recycle line splits at the lower end in at least two horizontal branches which are connected tangentially with the fluidized-bed reactor below the gas distribution grid.

In some embodiments, the gas recycle line splits in two branches which are attached to the fluidized-bed reactor on opposite sides.

In some embodiments, the gas distribution grid has the form of an inverted cone.

In some embodiments, the cone angle is from 100° to 160°.

In some embodiments, the gas distribution grid includes a plurality of trays being attached to each other to form slots in the overlapping area of adjacent trays and being successively overlapped, thereby forming annular modules of trays.

In some embodiments, the gas distribution grid has slots through which recycled gas enters the fluidized-bed reactor and which slots are formed such that the flow of gas after having passed the slots is parallel to the plane of the gas distribution grid and tangential with respect to a horizontal cross-section of the fluidized-bed reactor.

In some embodiments, the fluidized-bed reactor further has a polymer discharge pipe, which is integrated with the upper opening into the gas distribution grid.

In some embodiments, the upper opening of the polymer discharge pipe is arranged in the center of the gas distribution grid.

In some embodiments, the polymer discharge pipe is part of a polymer circulation loop which is connected at the upper end with the upper region of the fluidized-bed reactor.

In some embodiments, the volume of the fluidized-bed reactor below the gas distribution grid is divided by a non-pressure-resistant divider plate in an upper part and a lower part.

In some embodiments, the divider plate is horizontal.

In some embodiments, the equalization between the pressure in the volume above the divider plate and the pressure in the volume below the divider plate occurs by a pressure equilibration line which connects the volume below the divider plate and the gas recycle line.

In some embodiments, the fluidized-bed reactor is part of a reactor cascade.

In some embodiments, the present disclosure provides a process for preparing an olefin polymer including the step of homopolymerizing an olefin or copolymerizing an olefin and one or more other olefins at temperatures of from 20 to 200° C. and pressures of from 0.5 to 10 MPa in the presence of a polymerization catalyst, wherein the polymerization is carried out in the fluidized-bed reactor.

In some embodiments, the fluidized-bed reactor includes a polymer discharge pipe, which contains a bed of polyolefin particles which moves from top to bottom of the discharge pipe, and wherein a fluid is introduced into the discharge pipe in an amount that an upward stream of the fluid is induced in the bed of polyolefin particles above the fluid introduction point.

DETAILED DESCRIPTION OF THE INVENTION

Figure 1:
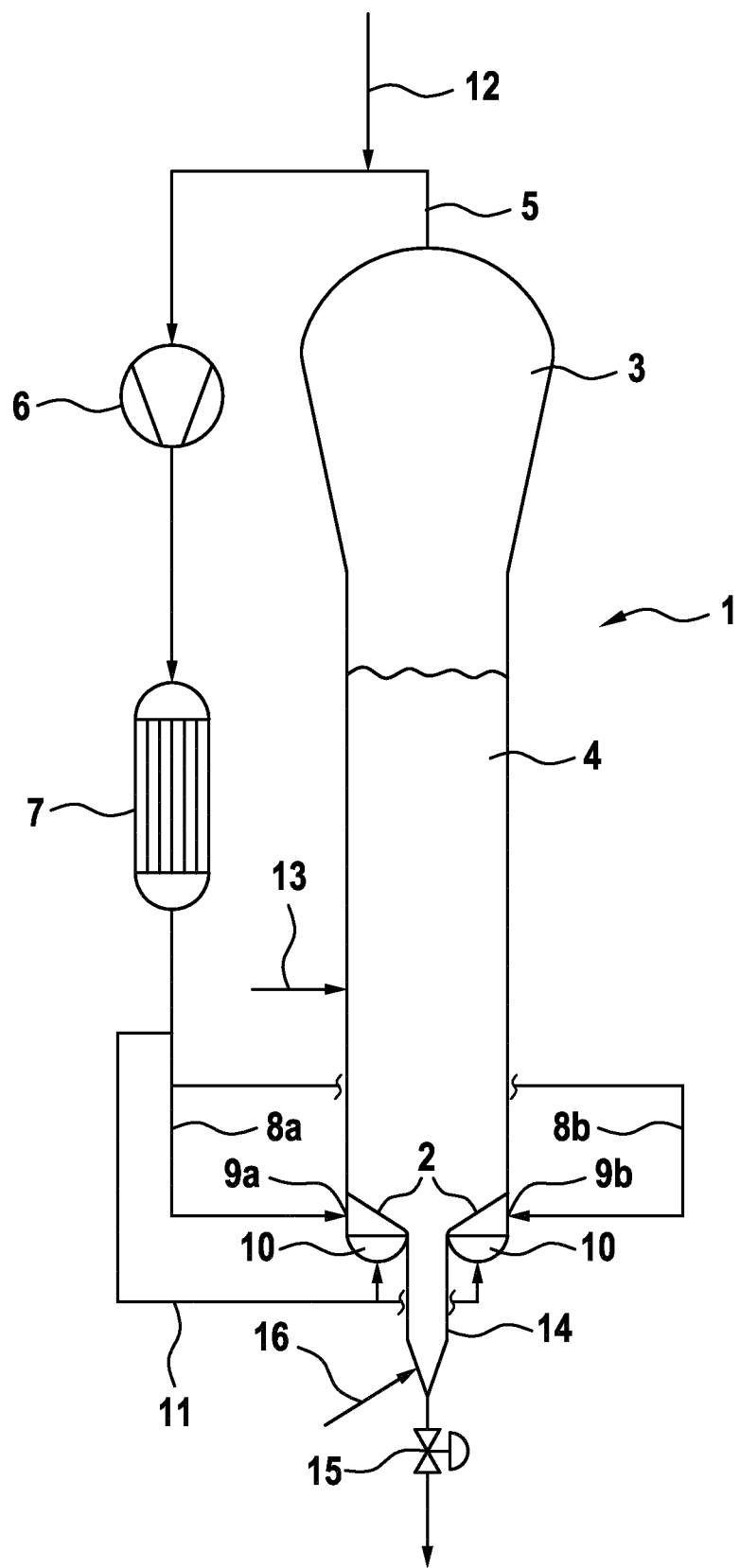
FIG. 1 shows schematically a fluidized-bed reactor.

In a general embodiment, the present disclosure provides a fluidized-bed reactor for the gas-phase polymerization of olefins. Fluidized-bed reactors are reactors wherein the polymerization takes place in a bed of polymer particles. The bed of polymer particles is maintained in a fluidized state by feeding in a reaction gas mixture at the lower end of a reactor and taking off the gas again at the top of the fluidized-bed reactor. In some instances, the reaction gas mixture is fed below a gas distribution grid having the function of dispensing the gas flow. After leaving the top of the fluidized-bed reaction, the reaction gas mixture is returned to the lower end to the reactor via a recycle line equipped with a compressor and a heat exchanger for removing the heat of polymerization. The flow rate of the reaction gas mixture is high enough firstly to fluidize the mixed bed of finely divided polymer present in the polymerization zone and secondly to remove the heat of polymerization.

In some embodiments, the olefins to be polymerized in the fluidized-bed reactor are 1-olefins, that is hydrocarbons having terminal double bonds, without being restricted thereto. In some embodiments, the olefins are nonpolar olefinic compounds. In some embodiments, the 1-olefins are linear or branched $C_2$-$C_{12}$-1-alkenes, alternatively linear $C_2$-$C_{10}$-1-alkenes such as ethylene, propylene, 1-butene, 1-pentene, 1-hexene, 1-heptene, 1-octene, 1-decene, alternatively branched $C_2$-$C_{10}$-1-alkenes such as 4-methyl-1-pentene, conjugated and nonconjugated dienes such as 1,3-butadiene, 1,4-hexadiene or 1,7-octadiene. In some embodiments, the olefins are mixtures of various 1-olefins. In some embodiments, the olefins have the double bond as part of a cyclic structure which can have one or more ring systems. In some embodiments, the cyclic olefins are selected from the group consisting of cyclopentene, norbornene, tetracyclododecene or methylnorbornene or dienes such as 5-ethylidene-2-norbornene, norbornadiene or ethylnorbornadiene. In some embodiments, the olefins are mixtures of two or more olefins.

In some embodiments, the fluidized-bed reactor is for the homopolymerization or copolymerization of ethylene or propylene, alternatively for the homopolymerization or copolymerization of ethylene. In some embodiments, the comonomers in propylene polymerization are up to 40 wt. % of ethylene, 1-butene and/or 1-hexene, alternatively from 0.5 wt. % to 35 wt. % of ethylene, 1-butene and/or 1-hexene. In some embodiments and as comonomers in ethylene polymerization, up to 20 wt. %, alternatively from 0.01 wt. % to 15 wt. %, alternatively from 0.05 wt. % to 12 wt. %, of $C_3$-$C_8$-1-alkenes is used. In some embodiments, the $C_3$-$C_8$-1-alkenes are selected from the group consisting of 1-butene, 1-pentene, 1-hexene and 1-octene. In some embodiments, ethylene is copolymerized with from 0.1 wt. % to 12 wt. % of 1-hexene and/or 1-butene.

In some embodiments, the polymerization is carried out in the presence of an inert gas such as nitrogen or an alkane having from 1 to 10 carbon atoms such as methane, ethane, propane, n-butane, isobutane, n-pentane, isopentane or n-hexane or mixtures thereof. In some embodiments, the inert gas is nitrogen or propane. In some embodiments, propane is used in combination with further alkanes. In some embodiments, the polymerization is carried out in the presence of a $C_3$-$C_5$ alkane as polymerization diluent, alternatively in the presence of propane. In some embodiments, the reaction gas mixtures within the reactor additionally is made from or contains the olefins to be polymerized, that is, a main monomer and one or more optional comonomers. In some embodiments, the reaction gas mixture has a content of inert components from 30 to 99 vol. %, alternatively from 40 to 95 vol. %, alternatively from 45 to 85 vol. %. In some embodiments, no or minor amounts of inert diluent are added. In some embodiments, the main monomer is propylene while no or minor amounts of inert diluent are added. In some embodiments, the reaction gas mixture is further made from or contains additional components. In some embodiments, the additional components are antistatic agents or molecular weight regulators. In some embodiments, the molecular weight regulator is hydrogen. In some embodiments, the components of the reaction gas mixture is fed into the gas-phase polymerization reactor or into the recycle gas line in gaseous form or as liquid which then vaporizes within the reactor or the recycle gas line.

In some embodiments, the polymerization of olefins is carried out using Phillips catalysts based on chromium oxide, using Ziegler- or Ziegler-Natta-catalysts, or using single-site catalysts. As used herein, the term "single-site catalysts" refers to catalysts based on chemically uniform transition metal coordination compounds. In some embodiments, the polymerization uses mixtures of two or more of these catalysts for the polymerization of olefins. In some embodiments, these mixed catalysts are designated as hybrid catalysts.

In some embodiments, the catalysts are of the Ziegler type, alternatively made from or containing a compound of titanium or vanadium, a compound of magnesium and optionally an electron donor compound and/or a particulate inorganic oxide as a support material.

In some embodiments, catalysts of the Ziegler type are polymerized in the presence of a cocatalyst. In some embodiments, cocatalysts are organometallic compounds of metals of Groups 1, 2, 12, 13 or 14 of the Periodic Table of Elements, alternatively organometallic compounds of metals of Group 13, alternatively organoaluminum compounds. In some embodiments, cocatalysts are organometallic alkyls, organometallic alkoxides, or organometallic halides.

In some embodiments, organometallic compounds are made from or contain lithium alkyls, magnesium or zinc alkyls, magnesium alkyl halides, aluminum alkyls, silicon alkyls, silicon alkoxides and silicon alkyl halides. In some embodiments, the organometallic compounds are made from or contain aluminum alkyls and magnesium alkyls. In some embodiments, the organometallic compounds are made from or contain aluminum alkyls, alternatively trialkylaluminum compounds or compounds of this type wherein an alkyl group is replaced by a halogen atom. In some embodiments, the halogen atom is chlorine or bromine. In some embodiments, the aluminum alkyls are trimethylaluminum, triethylaluminum, tri-isobutylaluminum, tri-n-hexylaluminum or diethylaluminum chloride or mixtures thereof.

In some embodiments, the fluidized-bed reactor is operated at pressures of from 0.5 MPa to 10 MPa, alternatively from 1.0 MPa to 8 MPa, alternatively from 1.5 MPa to 4 MPa. In some embodiments, the polymerization is carried out at temperatures of from 30° C. to 160° C., alternatively from 65° C. to 125° C. In some embodiments and when the resulting polymer will be an ethylene copolymer of high density, temperatures in the upper part of this range are used. In some embodiments and when the resulting polymer will be an ethylene copolymer of lower density, temperatures in the lower part of this range are used.

In some embodiments, the polymerization in the fluidized-bed reactor is carried out in a condensing or super-condensing mode, wherein part of the circulating reaction gas mixture is cooled to below the dew point and returned to the reactor either separately as a liquid and a gas-phase or together as a two-phase mixture to make additional use of the enthalpy of vaporization for cooling the reaction gas.

The fluidized-bed reactor of the present disclosure is characterized in that the gas recycle line splits at the lower end in at least two horizontal branches which are connected tangentially with the fluidized-bed reactor below the gas distribution grid. The tangential entries of the recycle gas generate a whirling motion of the recycle gas in the volume below the fluidization grid. In some embodiments, the gas recycle line is split at the lower end in two or more branches and smaller fluidization gas inlet nozzles are used, thereby permitting a smaller volume in the reactor below the gas distribution grid. In some embodiments, the gas recycle line splits in two branches which are connected to the fluidized-bed reactor on opposite sides.

In some embodiments, the gas distribution grid has the form of an inverted cone, alternatively a cone angle apex from 100° to 160°, alternatively from 120° to 150°.

In some embodiments, the gas distribution grid includes a plurality of trays being attached to each other to form slots in the overlapping area of adjacent trays and being successively overlapped, thereby forming annular modules of trays. In some embodiments, the gas distribution grids are as described in Patent Cooperation Treaty Publication No. WO 2008/074632 A1. In some embodiments, adjacent trays form a ring structure. In some embodiments, annular modules of trays are radially mounted side by side, thereby generating the entire structure of the gas distribution grid. In some embodiments, the annular modules are mounted on annular supports. In some embodiments and during start-up or shut-down of the reactor, the gas distribution grid is able to carry the bed of polymer particles. In some embodiments, the annular supports are supported by bars protruding from the bottom of the reactor. In some embodiments, from two to six annular modules of trays form the conical structure of the distribution grid, depending on the diameter of the fluidized-bed reactor. If trays with the same surface area are used, the outer peripheral modules make up a higher number of overlapping trays with respect to the inner central modules. In some embodiments, each annular module includes at least 6 trays, alternatively from 10 to 80 trays. In some embodiments and in the overlapping area of adjacent trays, a first tray forms the upper part of the intermediate slots while the successive tray forms the bottom part of the intermediate slots. In some embodiments, both trays have a shape adapted to form the intermediate slots. In some embodiments, the overlapping area of two adjacent trays has from 3 to 15 slots. In some embodiments, the number of slots increases from the inner to the peripheral annular modules in a way that the number of slots per area is constant over the grid.

In some embodiments, the gas distribution grid includes slots through which recycled gas enters the fluidized-bed reactor and the slots are formed such that the flow of gas after having passed the slots is parallel to the plane of the gas distribution grid and tangential with respect to a horizontal cross-section of the fluidized-bed reactor. In some embodiments, the tangential outlet of the fluidizing gas from the slots generates a whirling motion in the polymer bed close to the fluidization grid.

In some embodiments, the fluidized-bed reactor includes a gas distribution grid and a polymer discharge pipe, which is integrated with its upper opening into the distribution grid. In some embodiments, the upper opening of the polymer discharge pipe is arranged in the center of the gas distribution grid. In some embodiments, the polymer discharge pipe contains a packed bed of polyolefin particles which moves from top to bottom of the polymer discharge pipe.

In some embodiments, the polymer discharge pipe is part of a polymer circulation loop which is connected at the upper end with the upper region of the fluidized-bed reactor. In some embodiments, the polymer circulation loop includes, besides the polymer discharge pipe, a polymer discharge valve at the lower end of the polymer discharge pipe and a pneumatic conveyor pipe which has the function of reintroducing into the fluidized-bed reactor the polymer particles which bypass the discharge valve. In some embodiments, the transport of the polymer particles through the pneumatic conveyor pipe to the upper region of the fluidized-bed reactor occurs continuously by feeding a "thrust" gas at the inlet of the pneumatic conveyor. In some embodiments, this thrust gas is taken from the gas recycle line. In some embodiments, the ratio between the flow rate of polymer continuously recycled to the reactor via the circulation loop and the flow rate of polymer continuously discharged through the discharge valve is from 1 to 20, alternatively from 4 to 15.

In some embodiments, the whole content of the polymer discharge pipe is withdrawn from the fluidized-bed reactor. In some embodiments, the polyolefin particles leaving the polymer discharge pipe is transferred to a work-up section. In some embodiments, the polyolefin particles leaving the polymer discharge pipe are transferred to a further gas-phase polymerization reactor arranged downstream of the fluidized-bed reactor. In some embodiments, a fluid is introduced into the polymer discharge pipe as a barrier in an amount that an upward stream of the fluid is induced in the bed of polyolefin particles above the fluid introduction point, thereby preventing the reaction gas of the fluidized-bed reactor from being transported to the downstream arranged subsequent gas-phase polymerization reactor.

In some embodiments, the volume of the fluidized-bed reactor below the gas distribution grid is divided by a non-pressure-resistant divider plate in an upper part and a lower part. In some embodiments, the volume above the divider plate and the volume below the divider plate are kept at the same pressure and the divider plate does not have to withstand the polymerization pressure within the fluidized-bed reactor. In some embodiments, the volume above the divider plate and the volume below the divider plate are kept at the same pressure by a pressure equalization line. In some embodiments, the form of the divider plate is adapted to the gas flow within the volume below the gas distribution while the pressure resistant bottom of the fluidized-bed reactor has a shape which sustains the pressure within the fluidized-bed reactor.

In some embodiments, the divider plate is horizontal. In some embodiments, the divider plate is horizontal and curves upwards close to the connection to the outer wall of the fluidized-bed reactor. In some embodiments, the equalization between the pressure in the volume above the divider plate, which is the pressure within the fluidized-bed reactor, and the pressure in the volume below the divider plate occurs by a pressure equalization line which connects the volume below the divider plate and the gas recycle line.

In some embodiments, a divider plate installed in the volume below the gas distribution grid effects a reduced accumulation of polymer particles in the volume below the gas distribution grid. In some embodiments, the divider plate is installed shortly below the gas inlet nozzles. In some embodiments, the fine polymer particles do not settle in a low-lying part of the volume below the gas distribution grid. In some embodiments, the gas flow from the gas inlet nozzles along the divider plate into the polymerization reactor assists the re-transport of polymer particles entrained by recycle gas into the fluidized-bed reactor.

In some embodiments, the fluidized-bed reactor is part of a reactor cascade. In some embodiments, the other polymerization reactors of the reactor cascade are low-pressure polymerization reactors such as gas-phase reactors or suspension reactors. In some embodiments and when the polymerization process of the reactor cascade includes a polymerization in suspension, the suspension polymerization is carried out upstream of the gas-phase polymerization. In some embodiments, the reactors for carrying out such a suspension polymerization are loop reactors or stirred tank reactors. In some embodiments, the suspension media are inert hydrocarbons such as isobutane or mixtures of hydrocarbons or the monomers themselves. In some embodiments, such additional polymerization stages are carried out in suspension and include a pre-polymerization stage. In some embodiments, the multistage polymerization of olefins includes additional polymerization stages carried out in gas-phase and the additional gas-phase polymerization reactors are horizontally or vertically stirred gas-phase reactors, fluidized-bed reactors or multizone circulating reactors. In some embodiments, the additional gas-phase polymerization reactors are arranged downstream or upstream of the fluidized-bed reactor. In some embodiments, the fluidized-bed reactor is part of a reactor cascade wherein a multizone circulating reactor is arranged downstream of the fluidized-bed reactor.

In some embodiments, the multizone circulating reactors areas described in Patent Cooperation Treaty Publication Nos. WO 97/04015 A1 and WO 00/02929 A1 and have two interconnected polymerization zones, a riser, wherein the growing polymer particles flow upward under fast fluidization or transport conditions and a downcomer, wherein the growing polymer particles flow in a densified form under the action of gravity. The polymer particles leaving the riser enter the downcomer and the polymer particles leaving the downcomer are reintroduced into the riser, thereby establishing a circulation of polymer between the two polymerization zones and the polymer is passed alternately a plurality of times through these two zones. In such polymerization reactors, a solid/gas separator is arranged above the downcomer to separate the polyolefin and reaction gaseous mixture coming from the riser. The growing polyolefin particles enter the downcomer and the separated reaction gas mixture of the riser is continuously recycled through a gas recycle line to one or more points of reintroduction into the polymerization reactor. In some embodiments, the major part of the recycle gas is recycled to the bottom of the riser. In some embodiments, the recycle line is equipped with a compressor and a heat exchanger for removing the heat of polymerization. In some embodiments, a line for feeding catalyst or a line for feeding polymer particles coming from an upstream reactor is arranged on the riser and a polymer discharge system is located in the bottom portion of the downcomer. In some embodiments, the introduction of make-up monomers, comonomers, hydrogen and/or inert components occurs at various points along the riser and the downcomer.

FIG. 1 shows schematically a fluidized-bed reactor.

The fluidized-bed reactor (1) includes a gas distribution grid (2) having the shape of an inverted cone and a velocity reduction zone (3). In some embodiments, the velocity reduction zone (3) has an increased diameter compared to the diameter of the fluidized-bed portion of the reactor. During polymerization, the fluidized-bed reactor (1) contains a fluidized bed (4) of polyolefin particles. The polyolefin bed is kept in a fluidization state by an upward flow of gas fed through the gas distribution grid (2) placed at the bottom portion of the reactor (1). The gaseous stream of the reaction gas leaving the top of the velocity reduction zone (3) via recycle line (5) is compressed by compressor (6) and transferred to a heat exchanger (7), wherein the recycle gas is cooled. Below heat exchanger (7), the gas recycle line splits in two branches (8a) and (8b), which are horizontally connected with the fluidized-bed reactor (1) at positions (9a) and (9b) below the gas distribution grid (2) and above a divider plate (10), which divides the volume below the gas distribution grid (2) in an upper and a lower part. A pressure equalization line (11), which connects the volume below the divider plate with the gas recycle line, ensures the pressure balance between the interior of the fluidized-bed reactor (1) and the volume below the divider plate. In some embodiments, make-up monomers, molecular weight regulators, and optional inert gases are fed into the reactor (1) at various positions. In some embodiments, the make-up monomers, molecular weight regulators, and optional inert gases are fed via line (12) upstream of the compressor (6). In some embodiments, the catalyst is fed into the reactor (1) via a line (13). In some embodiments, line (13) is placed in the lower part of the fluidized bed (4).

The fluidized-bed reactor (1) further includes a vertical polymer discharge pipe (14), which is integrated with its upper opening into the gas distribution grid (2). The upper opening of the polymer discharge pipe (14) is located in a central position with respect to the gas distribution grid (2). At its lower end, the polymer discharge pipe (14) is provided with a discharge valve (15) for withdrawing the packed bed of polyolefin particles which forms within polymer discharge pipe (14). The polymer discharge pipe (14) further bears a feeding line (16) for introducing a fluid into polymer discharge pipe (14).

Figure 2A:
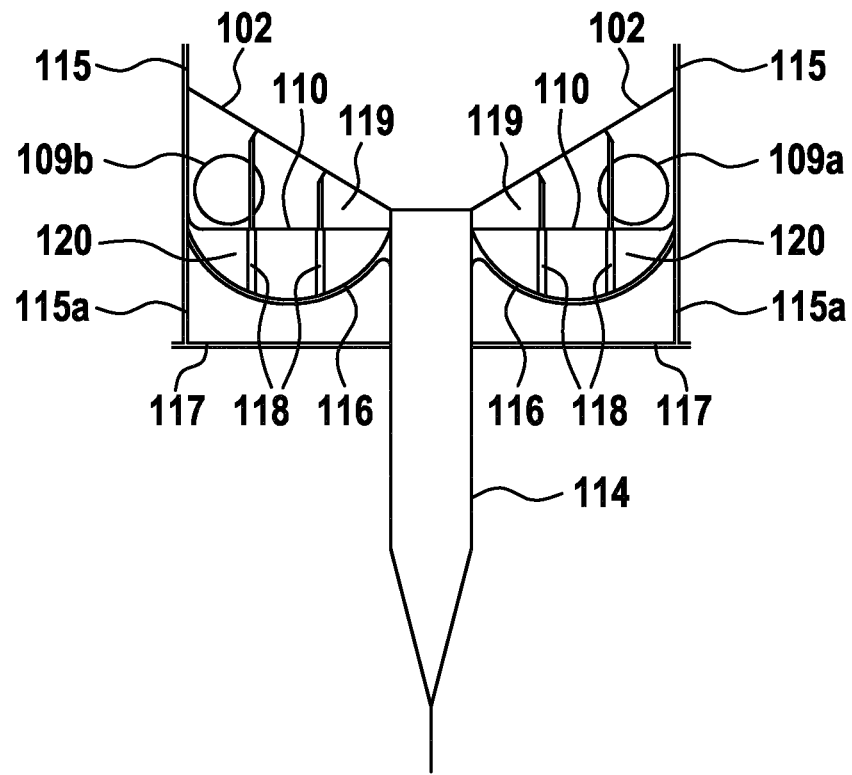
FIG. 2a and FIG. 2b show schematically cross-sections through the bottom part of a fluidized-bed reactor.

FIG. 2a shows schematically a vertical cross-section through the bottom part of a fluidized-bed reactor.

The bottom part includes a gas distribution grid (102) having the shape of an inverted cone and a polymer discharge pipe (114), which is integrated with the polymer discharge pipe's upper opening into the gas distribution grid (102) and is located in a central position with respect to the gas distribution grid (102). The recycle gas enters the reactor below the gas distribution grid (102) through gas inlet nozzles (109a) and (109b). The lower end of the pressurized space within the fluidized-bed reactor is formed by the outer wall (115) and the reactor bottom (116). The outer wall (115) extends into a support structure (115a) which is mounted on a foundation (117).

The gas distribution grid (102) is supported by bars (118), which have a lower part of a larger diameter and an upper part of a smaller diameter. The bars (118) further support a divider plate (110) which divides the volume below the gas distribution grid (102) in an upper part (119) and a lower part (120). The divider plate (110) is horizontal and curved upwards close to the connection to the outer wall (115).

Figure 2B:
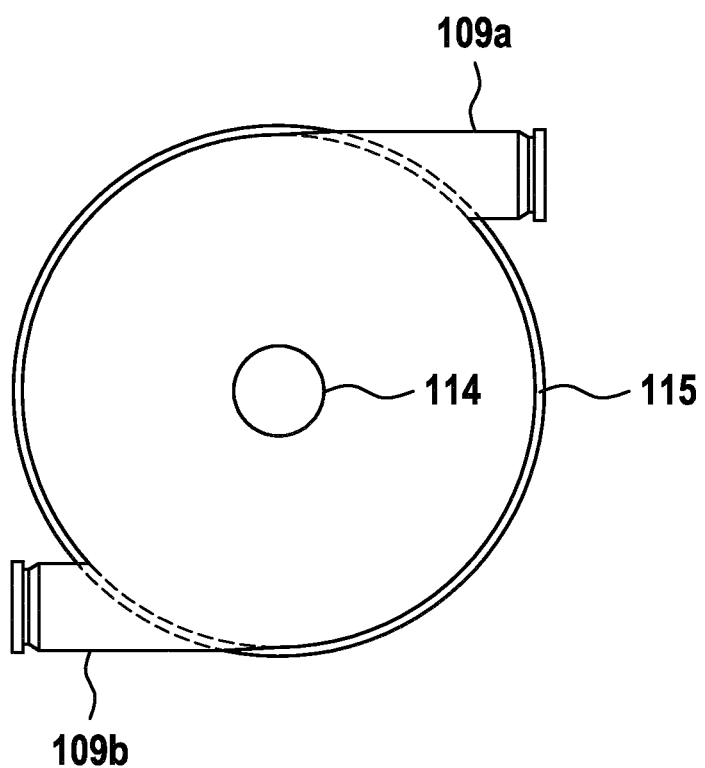

FIG. 2b shows schematically a horizontal cross-section through the bottom part of the fluidized-bed reactor depicted in FIG. 2a at the height of the upper opening of polymer discharge pipe (114) where gas inlet nozzles (109a) and (109b) are located.

In other embodiments, the present disclosure further provides a process for preparing an olefin polymer including the step of homopolymerizing an olefin or copolymerizing an olefin and one or more other olefins at temperatures of from 20 to 200° C. and pressures of from 0.5 to 10 MPa in the presence of a polymerization catalyst, wherein the polymerization is carried out in a fluidized-bed reactor.

In some embodiments, the process for preparing an olefin polymer is carried out in a fluidized-bed reactor including a polymer discharge pipe, which contains a bed of polyolefin particles which moves from top to bottom of the discharge pipe, and wherein a fluid is introduced into the discharge pipe in an amount that an upward stream of the fluid is induced in the bed of polyolefin particles above the fluid introduction point.

What is claimed is:

1. A process for preparing an olefin polymer comprising the step of:
   homopolymerizing an olefin or copolymerizing an olefin and one or more other olefins at temperatures of from 20 to 200° C. and pressures of from 0.5 to 10 MPa in the presence of a polymerization catalyst, wherein the polymerization is carried out in a fluidized-bed reactor wherein the fluidized-bed reactor comprises a gas distribution grid installed in a lower part of the fluidized-bed reactor and
   a gas recycle line, which is equipped with a compressor and a heat exchanger and which is connected at the upper end with the top of the fluidized-bed reactor, wherein the gas recycle line splits at the lower end in at least two horizontal branches which are connected tangentially with the fluidized-bed reactor below the gas distribution grid, and
   wherein the volume of the fluidized-bed reactor below the gas distribution grid is divided by a non-pressure-resistant divider plate in an upper part and a lower part.

2. The process of claim 1, wherein the fluidized-bed reactor comprises a polymer discharge pipe, which contains a bed of polyolefin particles which moves from top to bottom of the discharge pipe, and wherein a fluid is introduced into the discharge pipe in an amount that an upward stream of the fluid is induced in the bed of polyolefin particles above the fluid introduction point.

3. The process of claim 1, wherein the gas recycle line splits in two branches which are attached to the fluidized-bed reactor on opposite sides.

4. The process of claim 1, wherein the gas distribution grid has the form of an inverted cone.

5. The process of claim 4, wherein the cone angle is from 100° to 160°.

6. The process of claim 1, wherein the gas distribution grid comprises a plurality of trays being attached to each other to form slots in the overlapping area of adjacent trays and being successively overlapped, thereby forming annular modules of trays.

7. The process of claim 1, wherein the gas distribution grid comprises slots through which recycled gas enters the fluidized-bed reactor and the slots are formed such that the flow of gas after having passed the slots is parallel to the plane of the gas distribution grid and tangential with respect to a horizontal cross-section of the fluidized-bed reactor.

8. The process of claim 1, wherein the fluidized-bed reactor further comprises a polymer discharge pipe, which is integrated with the upper opening into the gas distribution grid.

9. The process of claim 8, wherein the upper opening of the polymer discharge pipe is arranged in the center of the gas distribution grid.

10. The process of claim 8, wherein the polymer discharge pipe is part of a polymer circulation loop which is connected at the upper end with the upper region of the fluidized-bed reactor.

11. The process of claim 1, wherein the divider plate is horizontal.

12. The process of claim 1, wherein the equalization between the pressure in the volume above the divider plate and the pressure in the volume below the divider plate occurs by a pressure equilibration line which connects the volume below the divider plate and the gas recycle line.

13. The process of claim 1, wherein the fluidized-bed reactor is part of a reactor cascade.

* * * * *